United States Patent [19]

Smith

[11] Patent Number: 5,355,612

[45] Date of Patent: Oct. 18, 1994

[54] SPINNER FISHING LURE

[76] Inventor: Stanley Smith, P.O. Box 188, Birch Tree, Mo. 65438

[21] Appl. No.: 971,016

[22] Filed: Nov. 2, 1992

[51] Int. Cl.$^5$ ............................................. A01K 85/00
[52] U.S. Cl. ................... 43/42.13; 43/42.11
[58] Field of Search ................. 43/42.11, 42.13, 42.12, 43/42.14, 42.31

[56] References Cited

U.S. PATENT DOCUMENTS

| | | | |
|---|---|---|---|
| 2,471,499 | 5/1949 | Shipman | 43/42.13 |
| 3,996,688 | 12/1976 | Hardwicke | 43/42.11 |
| 4,011,681 | 3/1977 | Johnson | 43/42.11 |
| 4,133,135 | 1/1979 | Miles | 43/42.13 |
| 4,536,986 | 8/1985 | Stout | 43/42.11 |
| 4,619,068 | 10/1986 | Wotawa | 43/42.11 |
| 4,625,448 | 12/1986 | Border | 43/42.11 |
| 4,718,191 | 1/1988 | Gentry | 43/42.11 |
| 5,050,334 | 9/1991 | Standish | 43/42.13 |

Primary Examiner—Kurt Rowan
Attorney, Agent, or Firm—Senniger, Powers, Leavitt & Roedel

[57] ABSTRACT

A spinner fishing lure having a frame including first and second diverging arms lying generally in the same plane. A hook is connected to the frame at the distal end of the first arm and lies generally in the plane of the first and second arms. The lure also includes at least two blades and connectors for connecting the blades to the frame generally at the distal end of the second arm. The blades are tethered to the connectors at spaced apart connection points such that the blades may swivel relative to the connectors generally sweeping out overlapping cones as the blades travel through the water so that the blades periodically strike one another to produce a noise attractive to fish. The connectors are configured so that the connection points of the blades and the blades are substantially vertically aligned as the lure is pulled through the water.

13 Claims, 1 Drawing Sheet

SPINNER FISHING LURE

BRIEF SUMMARY OF THE INVENTION

The present invention relates generally to fishing lures, and more particularly to a fishing lure having spinners which intermittently come into contact with one another to produce a noise attractive to fish.

The invention involves improvements for facilitating the attraction of fish to a spinner lure. In a typical configuration, a spinner lure consists of a wire member connected at one end to a weight and a hook, and connected at the other end to at least one spinner which is attached to the wire member by a swivel. It has been found that providing two spinners on the lure in a spaced relation particularly attracts fish because the lure's movement through the water resembles the movement of a smaller fish. Examples of such configurations can be found in U.S. Pat. Nos. 1,295,617, 1,591,704, 4,003,154, 4,033,065, 4,209,932, 4,329,804, 4,510,710, 4,640,041, 4,765,085, 4,773,180, 4,884,358, and 4,888,908. In each of these patents, the spinners are spaced far enough apart or diverge from one another so that they cannot come into contact when the lure is being pulled through the water. It has been found, however, that intermittent contact of the spinners as they travel through the water particularly enhances the attraction of fish to the lure.

Among the several objects of this invention may be noted the provision of an improved fishing lure which creates a noise attractive to fish; and the provision of such a fishing lure which is simple in construction and design, and easy to manufacture.

Generally, a spinner fishing lure of this invention comprises a frame including first and second diverging arms lying generally in the same plane. A hook is connected to the frame at the distal end of the first arm and lies generally in the plane of the first and second arms. The lure also comprises at least two blades and means for connecting the blades to the frame generally at the distal end of the second arm. The blades are tethered to the connecting means at spaced apart connection points such that the blades may swivel relative to the connecting means generally sweeping out overlapping cones as the blades travel through the water so that the blades periodically strike one another to produce a noise attractive to fish. The connecting means is configured so that the connection points of the blades and the blades are substantially vertically aligned as the lure is pulled through the water.

Other objects and features will be in part apparent and in part pointed out hereinafter.

BRIEF DESCRIPTION OF THE DRAWING

Corresponding parts are designated by corresponding reference numerals of the drawing.

DETAILED DESCRIPTION OF THE PREFERRED EMBODIMENT

Figure 1:
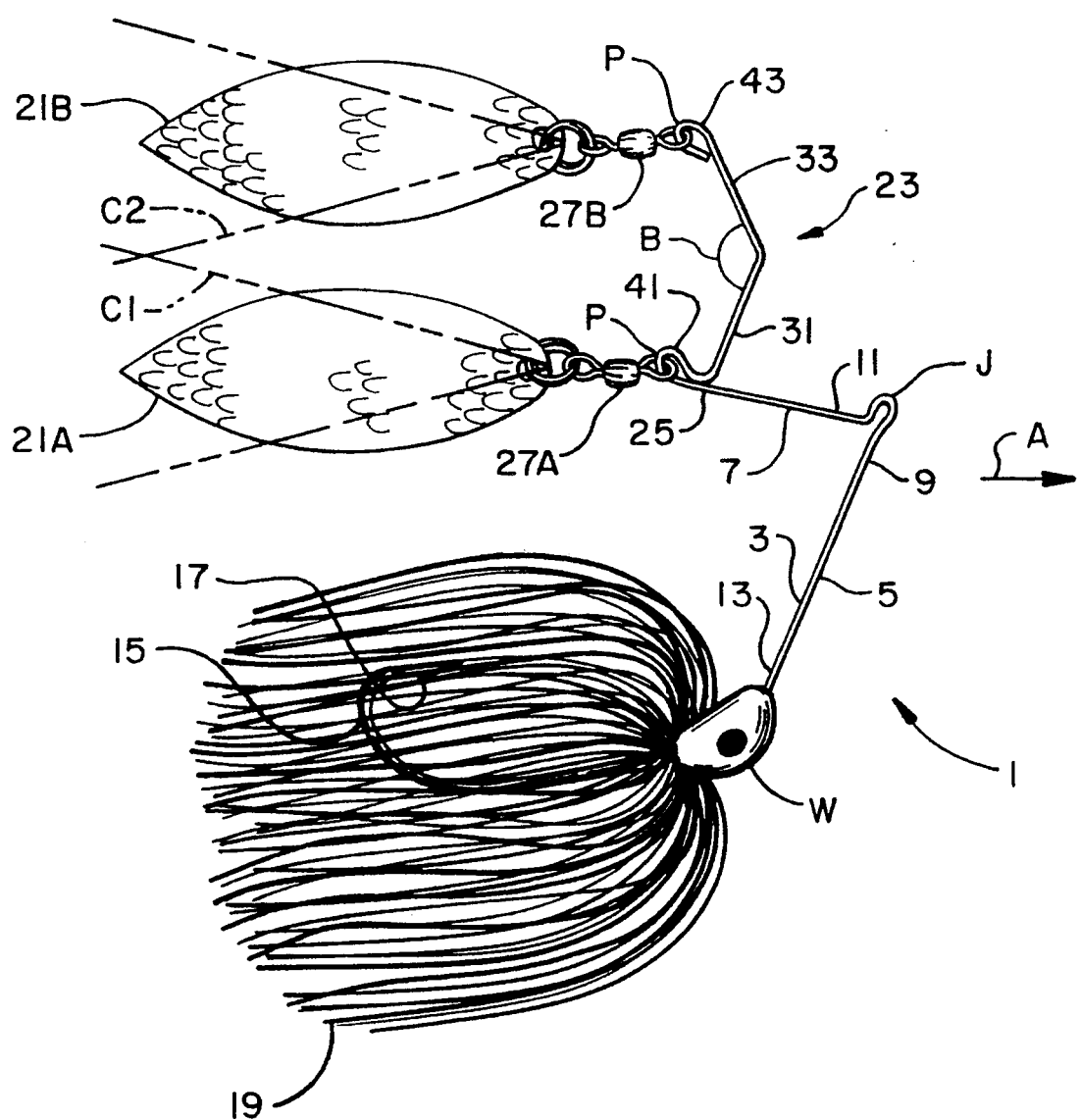
FIG. 1 is a plan of a spinner fishing lure.

Referring now to the drawing, there is generally indicated at 1 a spinner fishing lure of the present invention. The orientation of the lure 1 as it is pulled through the water in a direction indicated by arrow A is shown in FIG. 1. Lure 1 comprises a frame 3 having diverging arms 5, 7 lying generally in the same plane. The first and second arms 5, 7 are connected at respective ends 9, 11 in which the first arm extends from the second arm at an angle slightly less than ninety degrees. The frame 3 is made from wire material resistant to corrosion (e.g., stainless steel) of unitary construction in which a bend indicated at J is formed at the junction of arms 5, 7. It is at this junction J where the lure 1 is connected to a fishing line or line lead (not shown). As shown, arm 5 is slightly longer than arm 7.

A weight W is attached to the first arm 5 at its other end 13, and a hook 15 is attached to the weight away from the first arm. The hook 15 is provided with a barb 17 and lies in generally the same plane as the plane formed by the first and second arms 5, 7. The butt portion of the hook 15 extends upwardly relative to the direction the lure is being pulled to prevent the hook from catching objects as it is being pulled through the water. As shown, weight W and hook 15 extend at a small angle to the general direction of arm 5 which cumulatively form a generally obtuse angle. The hook 15 may be concealed by a skirt of elongated strips 19 formed of plastic, rubber or other suitable material attached to the weight W.

Lure 1 is provided with two blades or spinners 21A, 21B which are connected to the frame 3 by a wire member, indicated generally at 23. As is known in the art of fishing lures, spinners 21A, 21B are of convex/concave configuration and are approximately the same size. The spinners 21A, 21B are tethered by the wire member to arm 7 at its other end 25 by swivel connectors 27A, 27B. The swivels allow the axial rotation of the spinners as the lure is pulled through the water. As shown in the drawing, wire member 23 positions the spinners 21A, 21B at spaced apart connection points P such that they may swivel relative to the wire 23 while sweeping out overlapping cones as the spinners travel through the water. Exemplary cones swept out by the center lines of the spinners 21A, 21B are illustrated by the phantom lines C1, C2. Moreover, the spinners are spaced just enough apart such that they periodically strike one another to produce a noise which is believed to enhance the attraction of fish to the lure.

Wire member 23 includes a first portion 31 which extends outwardly from end 25 of the second arm 7 and a second portion 33 which is bent relative to the first portion. Preferably, the first and second portions 31, 33 of the wire member 23 define an angle B of 90 degrees or greater. This angle helps create the desired spacing and relative position of the spinners 21A, 21B as defined above. In its shown embodiment, wire member 23 is formed as one piece with the frame 3 and is joined thereto at the second arm 7. The frame 3, wire member 23 and hook 15 are held in fixed position relative one another and lie substantially in the same plane. Wire member 23 is formed into a first eyelet 41 at connecting point P adjacent its intersection with the second arm at the end of the first portion 31 remote from the second portion 33. The first eyelet 41 connects spinner 21A to the wire member 23 via swivel 27A. The wire member is again formed into a second eyelet 43 at its end remote from the wire member's intersection with the second arm 7. The second eyelet 43 is located at the remote end of the second portion 33 and connects spinner 21B to the wire member 23 via swivel 27B.

As shown in the drawing, spinners 21A, 21B are disposed generally one above the other with the upper spinner 21B slightly ahead of the lower spinner 21A as the lure 1 is pulled through the water. The spinners 21A, 21B are spaced just far enough apart so that they periodically strike each other as they travel through the water, while sweeping out overlapping cones. It has been found that the configuration disclosed herein best accommodates this movement.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A spinner lure comprising a frame including first and second diverging arms lying generally in the same plane, a hook connected to the frame at the distal end of the first arm and lying generally in the plane of the first and second arms, at least two blades, means for connecting the blades to the frame generally at the distal end of the second arm, the blades being tethered to said connecting means at spaced apart connection points such that the blades may swivel relative to said connecting means generally sweeping out overlapping cones as the blades travel through water so that the blades periodically strike one another to produce a noise attractive to fish, said connecting means being configured so that the connection points of the blades and the blades are substantially vertically aligned as the lure is pulled through the water.

2. A spinner lure as set forth in claim 1 wherein said connection means is configured so that the connection point of the upper of the two blades is forward of the connection point of the lower of the two blades as the lure is pulled through the water.

3. A spinner lure as set forth in claim 1 wherein said connecting means comprises a wire member including a first portion extending outwardly from the second arm of the frame and a second portion bent relative to the first portion whereby the first and second portions of the wire member define an angle of 90 degrees or greater.

4. A spinner lure as set forth in claim 3 wherein the wire member is formed as one piece with the frame, the hook, the first and second arms of the frame and first and second portions of the wire member being held in a fixed position relative to one another and lying substantially in the same plane.

5. A spinner lure as set forth in claim 4 wherein said wire member is formed into a first eyelet adjacent its intersection with the second arm, said first eyelet connecting a first of the blades to the wire member, and the wire member being formed into a second eyelet at its end remote from its intersection with the second arm, said second eyelet connecting the second of the blades to the wire member.

6. A spinner lure as set forth in claim 1 further comprising a weight located at said distal end of the first arm generally between the hook and the distal end of the first arm, the first arm extending at a generally obtuse angle from the weight and the hook.

7. A spinner lure as set forth in claim 1 wherein the first arm extends from the second arm at an angle slightly less than ninety degrees.

8. A spinner lure comprising a frame including first and second diverging arms lying generally in the same plane, a hook connected to the frame at the distal end of the first arm and lying generally in the plane of the first and second arms, at least two blades, means for connecting the blades to the frame generally at the distal end of the second arm, the blades being tethered to said connection means at spaced apart connection points such that the blades may swivel relative to said connecting means generally sweeping out overlapping cones as the blades travel through water so that the blades periodically strike one another to produce a noise attractive to fish, said connecting means being configured so that the blades are substantially vertically aligned and the connection point of the upper of the two blades is forward of the connection point of the lower of the two blades as the lure is pulled through the water.

9. A spinner lure as set forth in claim 8 wherein said connecting means comprises a wire member including a first portion extending outwardly from the second arm of the frame and a second portion bent relative to the first portion whereby the first and second portions of the wire member define an angle of 90 degrees or greater.

10. A spinner lure as set forth in claim 9 wherein the wire member is formed as one piece with the frame, the hook the first and second arms of the frame and first and second portions of the wire member being held in a fixed position relative to one another and lying substantially in the same plane.

11. A spinner lure as set forth in claim 10 wherein said wire member is formed into a first eyelet adjacent its intersection with the second arm, said first eyelet connecting a first of the blades to the wire member, and the wire member being formed into a second eyelet at its end remote from its intersection with the second arm, said second eyelet connecting the second of the blades to the wire member.

12. A spinner lure as set forth in claim 8 further comprising a weight located at said distal end of the first arm generally between the hook and the distal end of the first arm, the first arm extending at a generally obtuse angle from the weight and the hook.

13. A spinner lure as set forth in claim 8 wherein the first arm extends from the second arm at an angle slightly less than ninety degrees.

* * * * *